United States Patent
Boonie et al.

(10) Patent No.: US 6,658,513 B1
(45) Date of Patent: Dec. 2, 2003

(54) MANAGING LOCKS AFFECTED BY PLANNED OR UNPLANNED RECONFIGURATION OF LOCKING FACILITIES

(75) Inventors: Mark A. Boonie, Hopewell Junction, NY (US); George Edward Graffius, III, Huntingdon, PA (US); Mark A. Lehrer, Poughkeepsie, NY (US); Peter Lemieszewski, Poughkeepsie, NY (US); Susan Anderson Pavlakis, Bethel, CT (US); Steven Edwin Roach, Lagrangeville, NY (US); Glenn W. Sears, Jr., Ulster Park, NY (US); Mark T. Spies, Poughkeepsie, NY (US); Peter G. Sutton, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 09/685,623

(22) Filed: Oct. 10, 2000

(51) Int. Cl.[7] .............................................. G06F 12/00
(52) U.S. Cl. ........................ 710/200; 710/240; 710/241
(58) Field of Search ................................ 710/200, 240, 710/241, 242, 243, 244, 220; 707/200

(56) References Cited

U.S. PATENT DOCUMENTS

| | | | | |
|---|---|---|---|---|
| 5,423,044 A | | 6/1995 | Sutton et al. | 395/725 |
| 5,737,600 A | * | 4/1998 | Geiner et al. | 707/200 |
| 6,088,757 A | | 7/2000 | Boonie et al. | 710/200 |

* cited by examiner

*Primary Examiner*—Tim Vo
(74) *Attorney, Agent, or Firm*—Andrew J. Wojnicki, Jr., Esq.; Blanche E. Schiller, Esq.; Heslin Rothenberg Farley & Mesiti P.C.

(57) ABSTRACT

Changes in locking configurations are managed. A locking configuration includes one or more locking facilities and the one or more locking facilities include one or more locks. When a change in a locking configuration, either planned or unplanned, is detected, one or more of the locks are redistributed. For example, one or more of the locks affected by the change are moved from one or more of the locking facilities to one or more other locking facilities. This redistribution is independent of the location of the data associated with the one or more locks being moved. Thus, data and locks may be moved independently of one another and without affecting one another. Further, the redistribution can take place while the system is available or mostly available, thereby minimizing downtime.

55 Claims, 15 Drawing Sheets

ASSEMBLE DRAWINGS AS FOLLOWS:
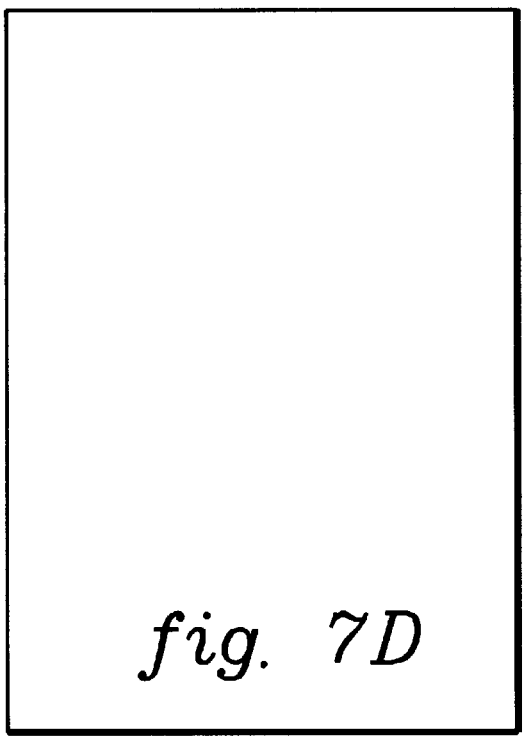
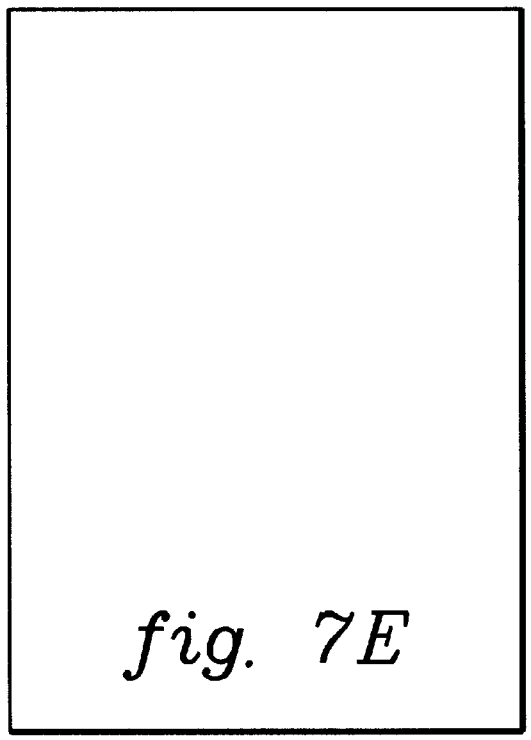

MANAGING LOCKS AFFECTED BY PLANNED OR UNPLANNED RECONFIGURATION OF LOCKING FACILITIES

CROSS-REFERENCE TO RELATED APPLICATIONS

This application contains subject matter which is related to the subject matter of the following applications/patents, each of which is assigned to the same assignee as this application. Each of the below listed applications/patents is hereby incorporated herein by reference in its entirety:

"Managing Via Copy Locks The Writing Of Data To Mirrored Storage Devices," Boonie et al., Ser. No. 09/686,343, filed Aug. 11, 2003, herewith;

"Method For A High Performance Locking Facility," Boonie et al., Ser. No. 09/143,328, filed Aug. 28, 1998;

"Apparatus For A High-Performance Locking Facility," Boonie et al., Ser. No. 09/143,632, filed Aug. 28, 1998;

"A Method And Apparatus For Conducting A High Performance Locking Facility In A Loosely Coupled Environment," Boonie et al., Ser. No. 09/143,324, filed Aug. 28, 1998;

"Computer Program Means And Device For Conducting High Performance Locking Facility In A Loosely Coupled Environment," Boonie et al., U.S. Pat. No. 6,088,757, issued Jul. 11, 2000; and "Shared, Distributed Lock Manager For Loosely Coupled Processing Systems," Sutton et al., U.S. Pat. No. 5,423,044, issued Jun. 6, 1995.

TECHNICAL FIELD

This invention relates, in general, to concurrency control, and in particular, to managing locks used for concurrency control, which are affected by a planned or unplanned reconfiguration of locking facilities.

BACKGROUND ART

Concurrency control is used to protect data shared by more than one operating system (either homogeneous or heterogeneous operating systems). In particular, concurrency control is used to manage access to the data by multiple tasks on multiple operating systems, thereby preventing corruption of the data. In one example, this concurrency control is handled through the use of locks.

Previously, locks have been directly tied to the data, such that any movement of the locks also required movement of the data associated with the locks. In one example, the locks are defined in the storage device (e.g., DASD) mechanism itself. That is a portion of the random access memory of the DASD control unit is used to maintain a set of locks for accessing each DASD unit. The control unit has a plurality of channel ports to which processors may be attached. Each channel port may hold one or more locks on one or more portions of a particular DASD as a proxy for the processor connected to that channel. The locks are managed based on the physical connection of the channel to the channel port.

The tying of data directly to the locks causes various problems. For example, a failure of the storage device requires not only recovery of the data, but also recovery of the locks. Further, any movement of the locks also affects movement of the associated data. Thus, a need exists for a facility in which locks can be recovered without affecting the location of the data associated with those locks.

SUMMARY OF THE INVENTION

The shortcomings of the prior art are overcome and additional advantages are provided through the provision of a method of managing changes in locking configurations. The method includes, for instance, detecting a change in a locking configuration, the locking configuration including one or more locking facilities, and the one or more locking facilities including one or more locks; and redistributing at least one lock, in response to detecting the change in the locking configuration, wherein the redistributing is independent of the location of the data associated with the at least one lock in that the redistribution does not change where the data is stored.

System and computer program products corresponding to the above-summarized methods are also described and claimed herein.

Advantageously, the capabilities of the present invention enable locks to be managed independently of the data associated with those locks. The locks are stored in a facility that is remote from and independent of the mechanism used to store the data and of the operating systems using the data. Thus, the locks can be recovered independent from the data. Further, the locks can be moved from one locking facility to another locking facility without affecting the location of the data associated with those locks.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, when a change (i.e., an unplanned or planned change) in a locking configuration is detected, one or more locks of the locking configuration are redistributed. As one example, each lock to be redistributed is moved from one locking facility to another locking facility. The locking facility receiving the lock is one of the locking facilities of the new locking configuration (i.e., the locking configuration that represents the change).

Figure 1:
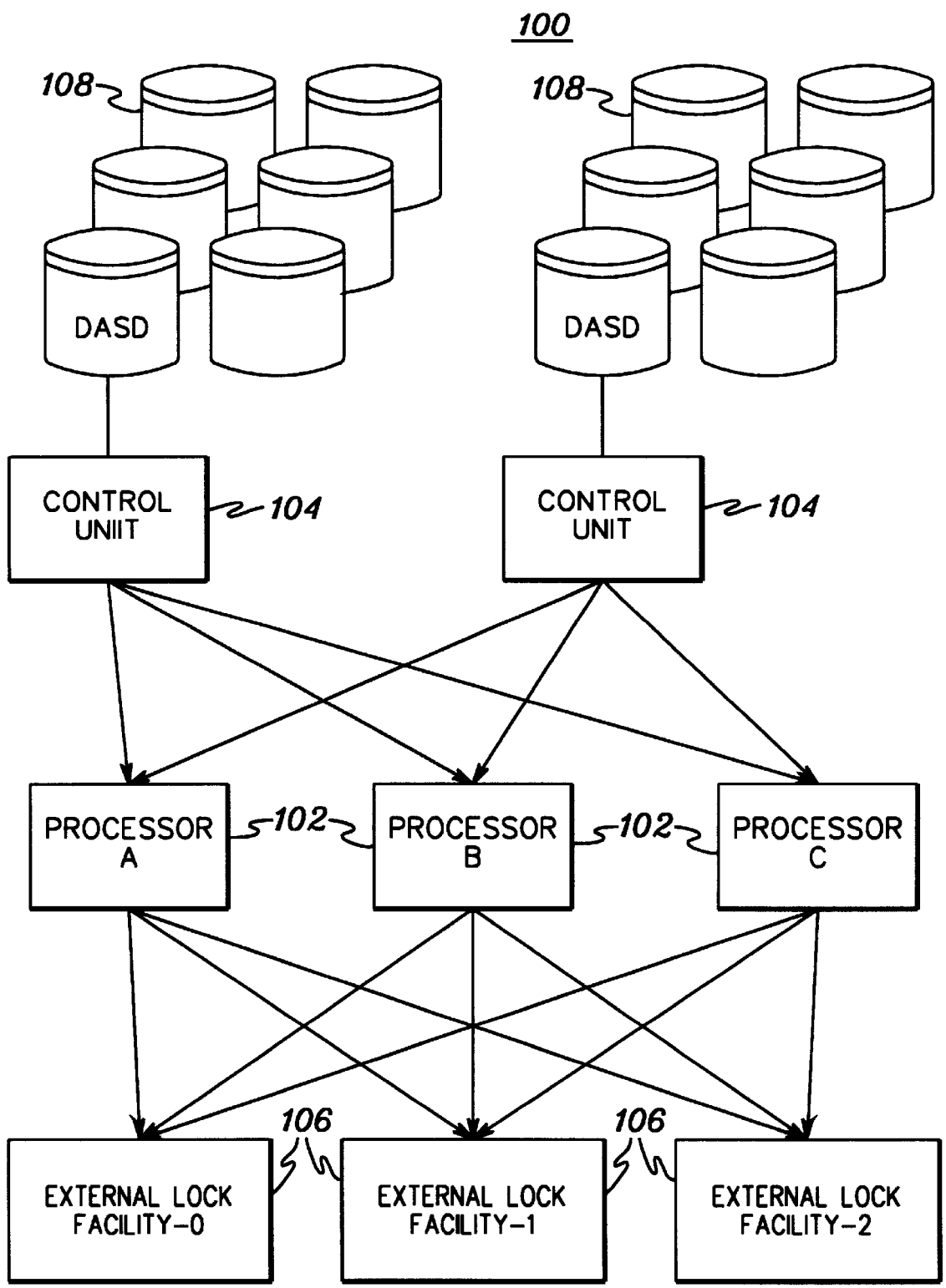
FIG. 1 depicts one embodiment of a computing environment incorporating and using aspects of the present invention.

In one example, the locking facilities are part of a computing environment. One embodiment of a computing environment incorporating and using one or more aspects of the present invention is described with reference to FIG. 1. A computing environment 100 is based, for instance, on the Enterprise Systems Architecture (ESA)/390 offered by International Business Machines Corporation, Armonk, N.Y. ESA/390 is described in an IBM publication entitled *Enterprise Systems Architecture/390 Principles of Operation*, IBM Publication No. SA22-7201-06, July 1999, which is hereby incorporated herein by reference in its entirety.

Computing environment 100 includes, for example, one or more processors 102, which are coupled to one or more control units 104 and further coupled to one or more external lock facilities 106, each of which is described below.

A processor 102 is either a single processor, having one central processing unit, or a tightly coupled multiprocessor, having a plurality of central processing units. In a tightly coupled multiprocessor, the central processing units share the same internal memory. Computing environment 100 can include single processors, tightly coupled multiprocessors, or any combination thereof. Each processor executes at least one operating system, such as the Transaction Processing Facility (TPF) operating system, offered by International Business Machines Corporation.

Each processor 102 is coupled to one or more control units 104. The control units are responsible for coupling the processors to one or more storage devices 108 (e.g., Direct Access Storage Devices (DASD)) to enable the storing of data within the storage devices.

The processors are also coupled to external lock facilities 106. In one example, each external lock facility is a coupling facility (e.g., a structured external storage (SES) processor), which contains storage accessible by the processors and performs operations requested by programs in the processors. Aspects of the operation of a coupling facility are described in detail in such references as Elko et al., U.S. Pat. No. 5,317,739 entitled "Method And Apparatus For Coupling Data Processing Systems," issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued Oct. 1, 1996; Elko et al., U.S. Pat. No. 5,706,432, entitled "Mechanism For Receiving Messages At A Coupling Facility," issued Jan. 6, 1998; and the patents and applications referred to therein, all of which are hereby incorporated herein by reference in their entirety.

In one example, computing environment 100 is a loosely coupled complex, in which the processors share the same storage devices and locking facilities, but they do not share the same processor memory. The use of a loosely coupled complex however, is only one example. Aspects of the present invention can be used with other types of environments. Further, a processor can be considered an image in a logically partitioned environment, or an hypervised image controlled by a hypervisor, such as VM. These and other variations of the computing environment are possible without departing from the spirit of the present invention.

In accordance with an aspect of the present invention, the external locking facilities and the locks stored therein are physically separate from the data that is stored in the storage devices (e.g., on DASD) and physically separate from the DASD mechanism itself (e.g., including the control unit). Since the data is physically separate from the locks, if one of the storage devices fails, there may be no need for recovery of the locks. Conversely, if an external locking facility fails, there is no need to recover the data. The locks can be recovered, without affecting the data, by moving the locks to other active locking facilities. In one example, the redistribution of the locks, which is in response to a planned or unplanned configuration change (either from adding or deleting an external locking facility), is performed by moving a minimum number of locks.

In one aspect of the present invention, in order to manage the locks associated with a configuration change, various data structures are used. As one example, these data structures include a lock configuration table and a lock distribution table (or list or other structure), each of which is described with reference to FIG. 2a.

In one example, a lock configuration table 200 includes an entry 202 for each of the active external lock facilities associated with the lock configuration. Further, each external lock facility entry 202 includes, for instance, at least two structure entries 204, 206. Structure entry 204 is an internal locking structure that includes a list of the locks associated with its external locking facility; and structure entry 206 is a notify structure used to pass information between the processors of the complex.

Lock configuration table 200 also includes tablewide fields 208, which include various information associated with the table, as described herein. Additionally, the table includes a past pointer 210, a present pointer 212, and a future pointer 214, each of which references its respective lock distribution table 220. For example, present pointer 212 indicates the current lock distribution table, while past pointer 210 references a previous lock distribution table, and future pointer 214 points to a new lock distribution table.

In one embodiment, lock distribution table 220 includes, for instance, an entry 222 for each module (e.g., DASD module) associated with the complex, and tablewide fields 224, which include various information pertinent to table 220. In each entry 222, a value is stored, which represents the external lock facility that includes the zero or more locks for that module. For instance, the first entry represents Module 1, and it includes a value of 0 indicating that the locks for Module 1 are stored within Lock Facility 0.

A copy of the lock configuration table and the lock distribution table (at least the current version) are stored at each processor for use during recovery, precipitated by either a planned or unplanned configuration change. That is, each processor registered as part of the complex starts with a known lock configuration table and lock distribution table, which are stored in local memory. The tables also reside on external storage devices (such as DASD), so that new processors which join the complex have knowledge of the configuration.

Further details associated with the configuration and distribution tables and with managing a lock reconfiguration are described with reference to FIGS. 3–7f. In particular, FIG. 3 describes a situation in which a processor detects a problem with an external locking facility, and FIGS. 4–7f describe the logic associated with managing the change in the configuration caused by the detected problem. In one example, the logic is performed by an operating system of each active processor of the complex.

Although the embodiment described herein is with reference to a processor detecting a problem with an external locking facility, the logic may also be used for managing other unplanned configuration changes or for managing planned configuration changes, which include either the addition or removal of an external locking facility. In those embodiments, the processor detects or is notified of a planned or other unplanned reconfiguration, and thus, initiates a change to the lock configuration.

Figure 3:
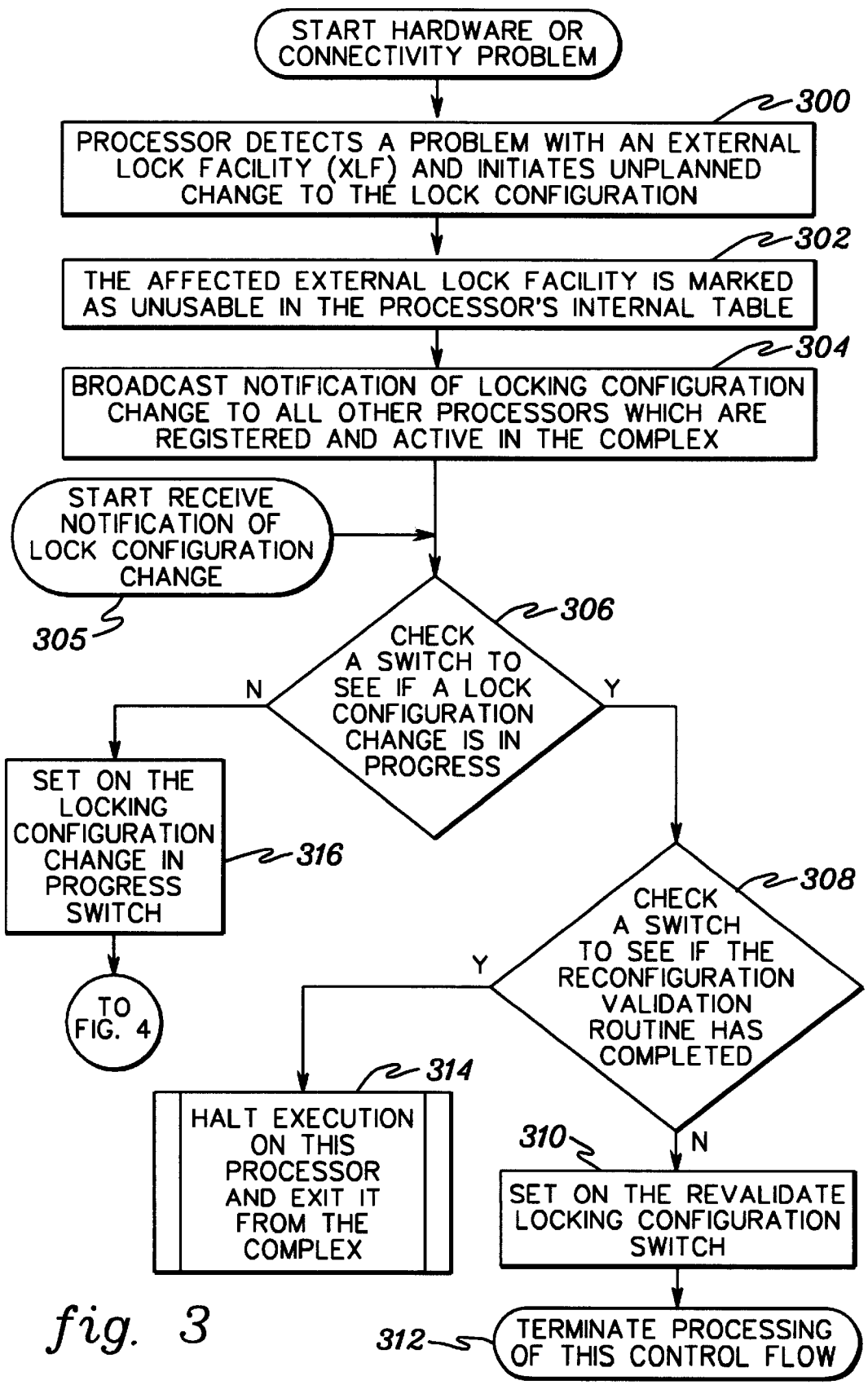
FIG. 3 depicts one example of the logic associated with detecting a configuration change, in accordance with an aspect of the present invention.

Referring to FIG. 3, initially, in one example, a processor detects a problem with an external lock facility and thus, initiates an unplanned change to the lock configuration, STEP 300. As examples, the problem is detected when the processor receives an error code from the external lock facility, in response to the initiation of an I/O operation to the external lock facility, or when the processor receives an error code as part of a response returned from the external lock facility.

The affected external lock facility is then marked as unusable in the processor's internal table, STEP 302. For instance, a bit flag in the tablewide fields of the lock configuration table (FIG. 2a) is set to a value indicating that the external lock facility is unusable. New locking requests assigned to the affected external lock facility are queued pending resolution of a new lock configuration table and a new lock distribution table.

Thereafter, the processor broadcasts notification of a locking configuration change to all the other processors which are registered and active in the complex, STEP 304. (In another embodiment, the broadcast is to a subset of the processors.) As each processor receives notification of the lock configuration change, either due to a planned or unplanned change, STEP 305, each processor independently recovers the locks it owns, as described herein. Further, one or more of the processors may independently detect the change and thus, start at STEP 300.

Figure 2A:
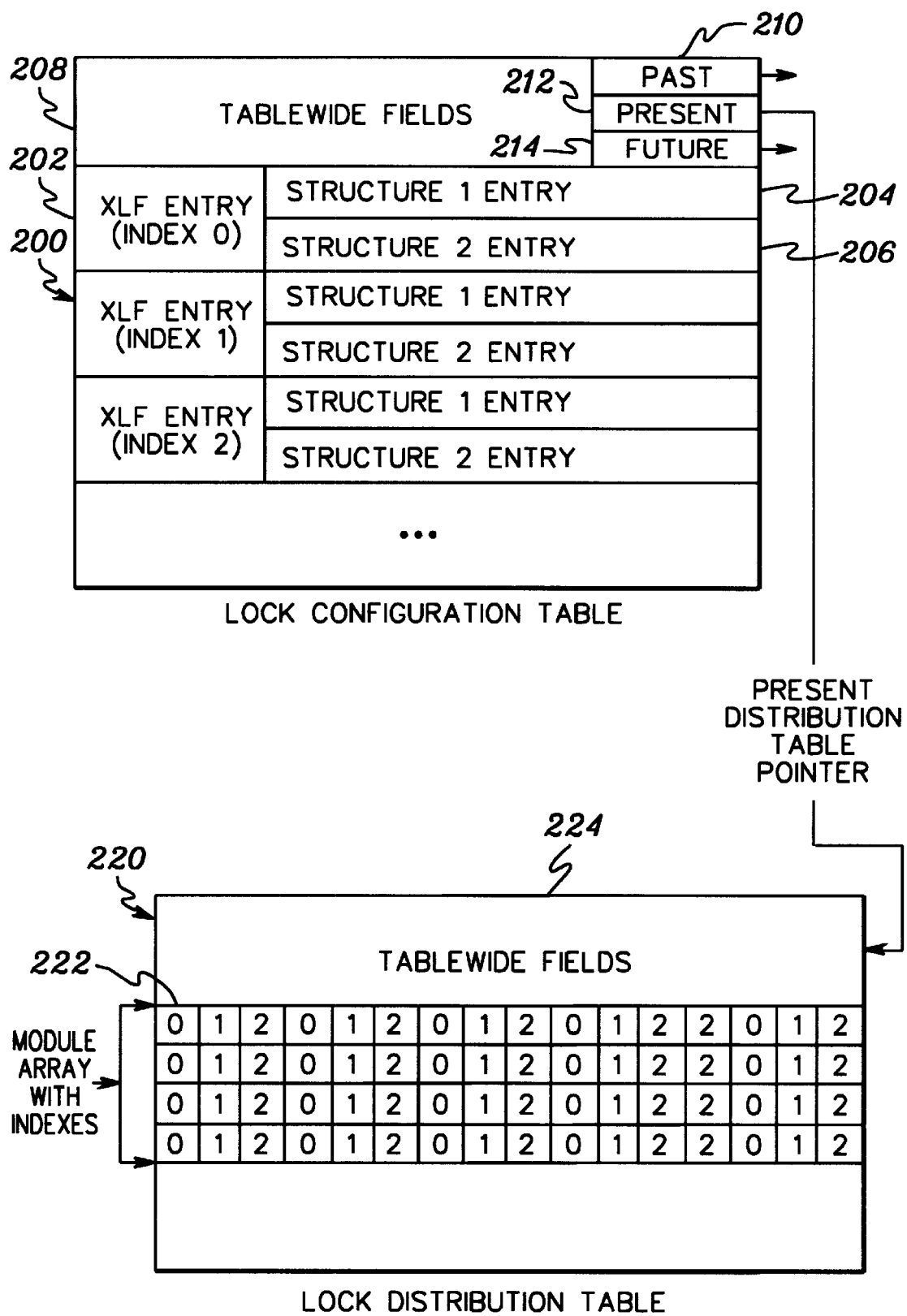
FIG. 2a depicts one embodiment of a lock configuration table and its associated lock distribution table, in accordance with an aspect of the present invention.

Subsequent to sending the broadcast notification, a determination is made as to whether a lock configuration change is already in progress, INQUIRY 306. In one example, this determination is made by checking a switch (or a field) in the tablewide fields of the lock configuration table (FIG. 2a). Should the determination indicate that a lock configuration change is already in progress, then a further check is made to see if a reconfiguration validation routine (described below) has completed, INQUIRY 308. Again, this determination is made by checking a switch (or a field) in the tablewide fields of the current lock configuration table (FIG. 2a). If the reconfiguration validation routine has not completed, then a revalidate locking configuration switch (or field) of the tablewide fields is set, STEP 310, and processing of this control flow is terminated, STEP 312.

Returning to INQUIRY 308, if however, a lock configuration change is already in progress and the reconfiguration validation routine has completed, then processing on this processor is halted, and the processor is removed from the complex, STEP 314. In one example, the processor is removed from the complex by setting a field in a table of processors indicating the processor is no longer active. Eventually, each of the processors will execute this logic, and the various processors will be halted indicating catastrophic processing.

Returning to INQUIRY 306, if a lock configuration change is not already in progress, then a locking configuration change in progress switch (or field) in the lock configuration table is set on, STEP 316, and processing continues with the configuration change.

One embodiment of the details associated with processing the configuration change is described with reference to FIG. 4. This logic is for both planned and unplanned configuration changes. As described herein, the processors are signaled to enter this logic by the processor that discovers the configuration change (or each processor can discover the change independently and enter this logic on its own). With this logic, the status of a processor's connectivity to the external locking facilities is verified; a new lock distribution table is resolved; the locks are rebuilt in their new location; any stray external locking facilities are cleaned up from the tables; and the new lock distribution table is written out to external storage devices (e.g., DASD), as described below.

Initially, the status of a processor's connectivity to the various external locking facilities is verified, STEP 400. In one instance, this verification is achieved by attempting an I/O operation to each external locking facility listed in the processor's lock configuration table. If the I/O operation is performed, then the facility is included on a list of facilities with which the processor can successfully communicate. However, if an error is received, then the external locking facility is left off of the list. Thus, a list of external locking facilities with which this processor can communicate is resolved.

This list is shared with the rest of the processors of the complex. Once all the processors have received responses from all the other processors, a common list of usable external lock facilities is resolved and that list is considered the new locking configuration (i.e., the least common denominator). Should a processor resolve an empty list of available external lock facilities, the processor will share a full list (so that this processor does not affect the outcome), and then it will remove itself from the complex.

In addition to determining the new locking configuration, any new processors are inhibited from being brought into the complex, STEP 402. That is, in this embodiment, a new processor is not allowed to be brought into the complex at the same time the lock configuration is being reconfigured. In one example, the inhibition of any new processor is performed by setting an indicator in a table (or a file) that is checked each time a processor tries to be brought into the complex. If the flag is on, then the processor stops itself from being brought into the complex.

Subsequently, a future lock distribution table is created, STEP 404. The future lock distribution table is built in memory based on the new resolved list of external locking facilities and a copy of the current distribution table. This process is being performed, in one instance, in all the processors substantially simultaneously. Since all the processors are using the least common denominator of external locking facilities common to the complex, each processor resolves the same new lock distribution table. In one example, the new lock distribution table is created in such a manner that causes the fewest number of locks to be moved to a new location. Further details regarding the creation of a future lock distribution table is described in detail further below.

After creating the future lock distribution table, all the locks to be moved are rebuilt in their new locations, STEP 406. In particular, the future lock distribution table is now used to perform lock movement (i.e., rebuilding). As described below, this includes stopping any lock operations, rebuilding the locks, and then restarting the lock operations. This is a stepped process and no processor continues with the next step until all the processors have communicated that they have completed the previous steps. Further details regarding the rebuilding of locks is described with reference to FIGS. 5–6b.

Figure 5:
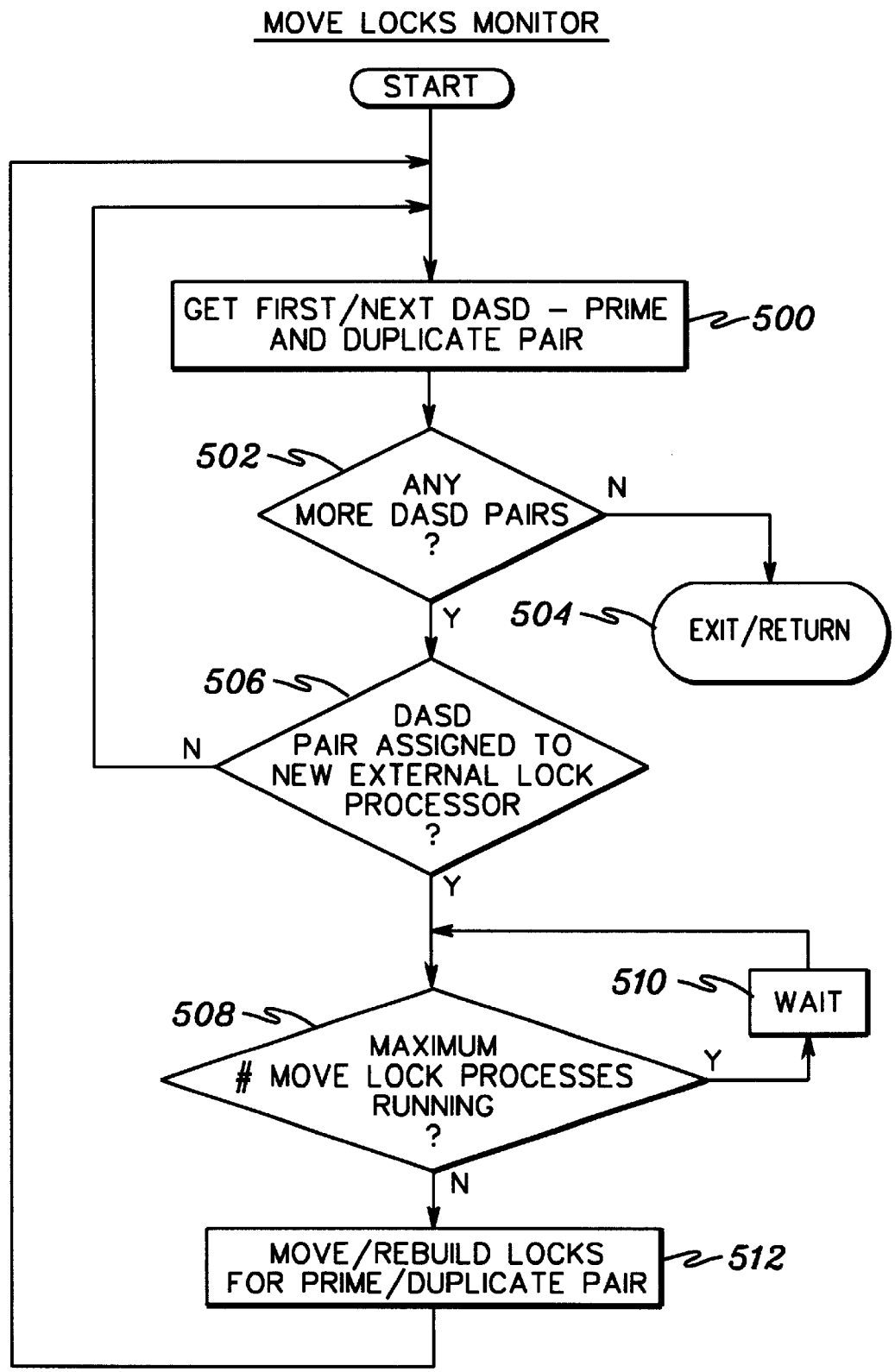
FIG. 5 depicts one embodiment of the logic associated with a move locks monitor, which invokes move lock processes, in accordance with an aspect of the present invention.

Referring to FIG. 5, a move locks monitor, which is invoked by each of the active processors of a complex, initiates one or more move lock processes to move any locks owned by the processor that now have a new association with an external lock facility. The move locks monitor is able to throttle system throughput by allowing a user-defined number of lock rebuild processes to run concurrently, as described below.

In one embodiment, locks are moved when the storage device module associated with those locks is reassigned to a different external lock facility. Thus, in order to determine whether a module has been reassigned, an attempt is made to select a storage device module (which, in one example, includes a primary and duplicate pair), STEP 500. If there are no more modules to be selected, INQUIRY 502, processing of the move locks monitor is complete, STEP. 504, and processing returns to STEP 406 of FIG. 4.

However, if there are more modules to be processed, then a module is selected, and a determination is made as to whether this module has been assigned to a new external lock facility, INQUIRY 506. In one example, this determination is made by comparing the future lock distribution table with the current lock distribution table. Should the comparison indicate that the module has not been assigned to a new external lock facility, then processing continues with STEP 500. However, if the module has been assigned to a new external lock facility, then a determination is made as to whether the maximum number of move lock processes (e.g., 5) are running, INQUIRY 508. If the maximum number of move lock processes are running, then a new process to move the locks associated with this module is not spawned, at this time, STEP 510. However, when the maximum number of move lock processes are not running, then a move lock process for this module is initiated, STEP 512.

Figure 6A:
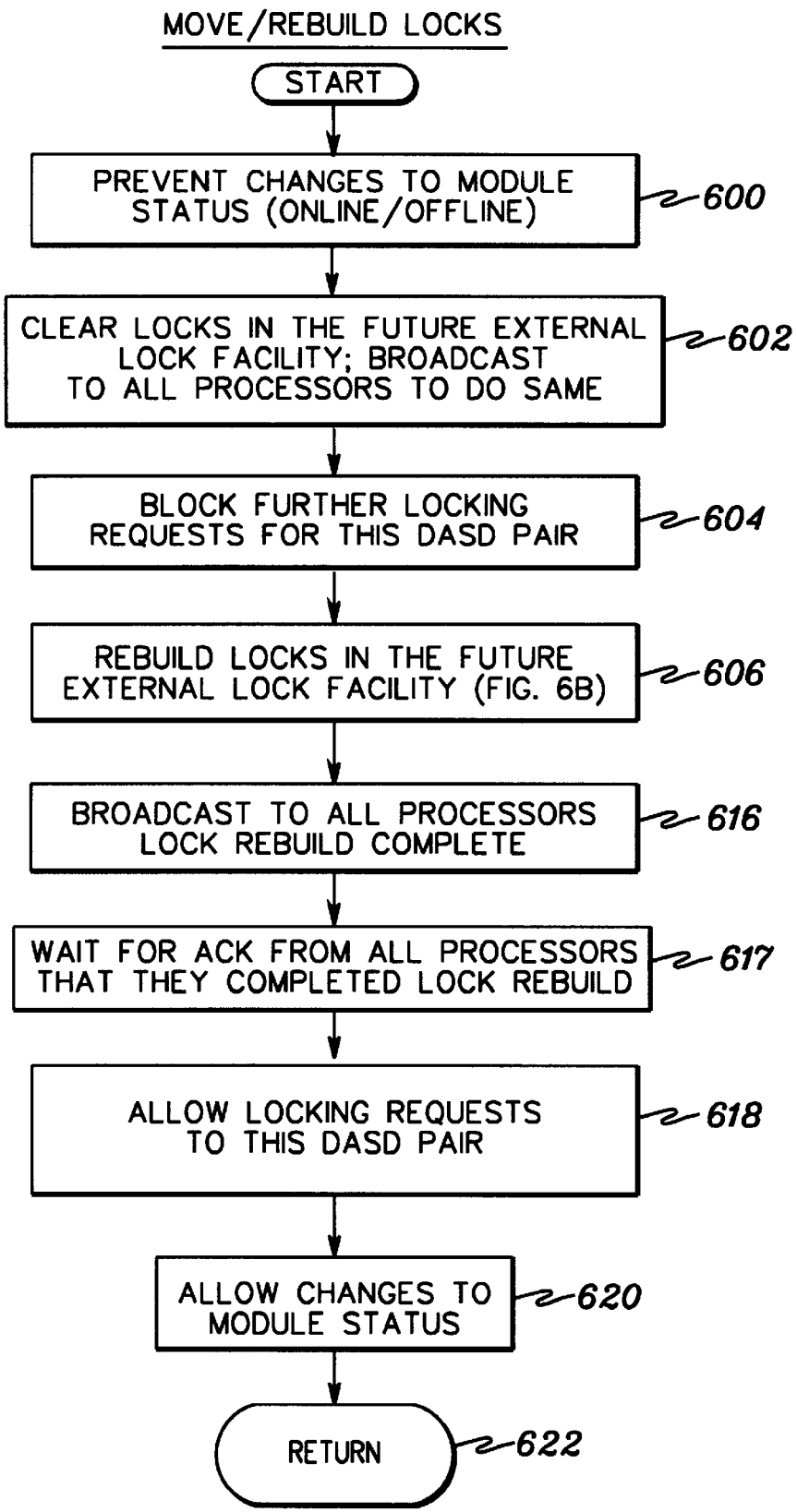
FIGS. 6a–6b depict one embodiment of the logic associated with moving locks in response to a configuration change, in accordance with an aspect of the present invention.
Figure 6B:
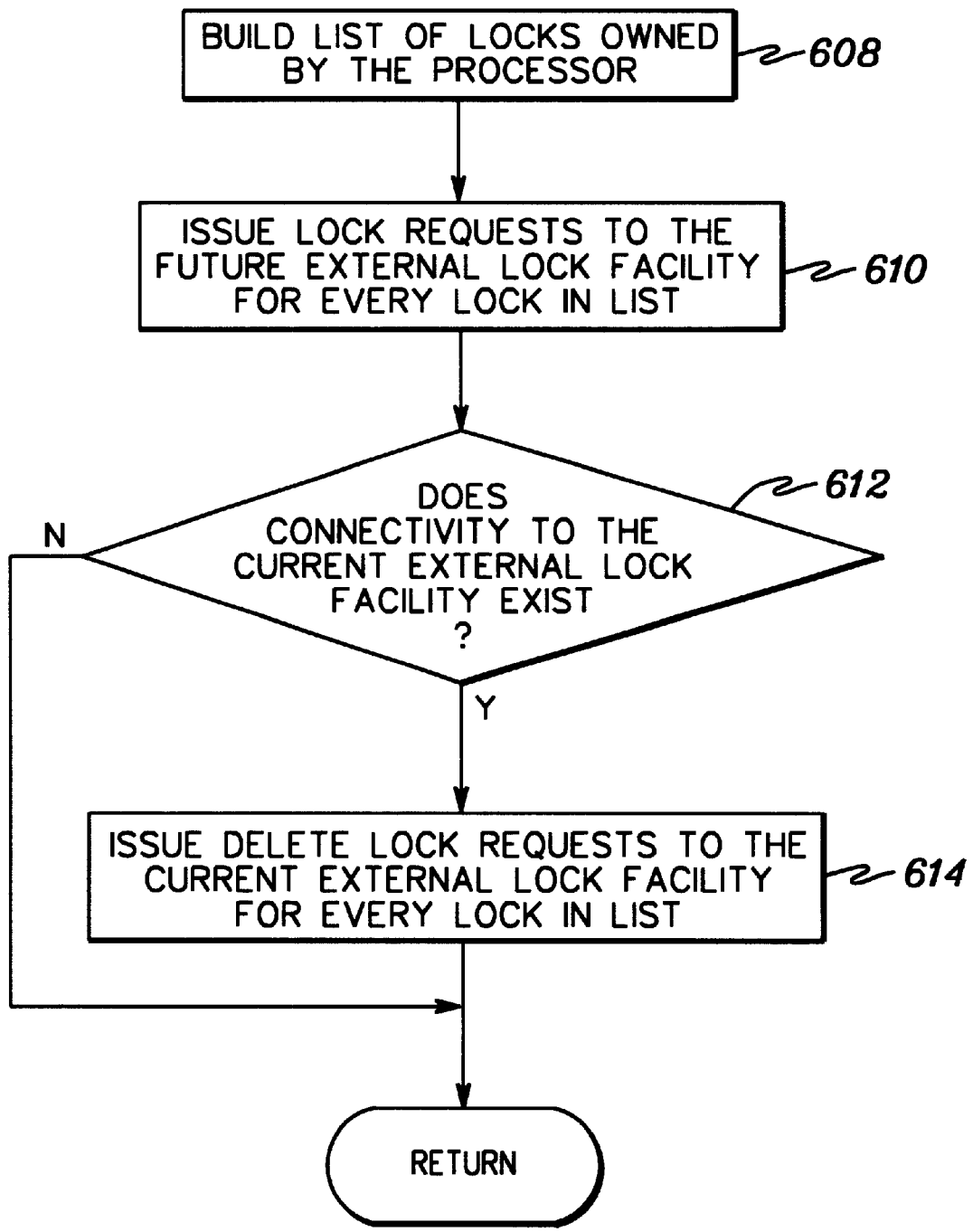

One embodiment of moving/rebuilding the locks for a module is described with reference to FIGS. 6a–6b. Referring to FIG. 6a, initially, changes to the module's status (i.e., online/offline) are prevented, STEP 600. Thereafter, any locks existing in the external lock facility, which is assigned to this module in the future distribution table (referred to herein as the future external lock facility) are cleared, and a broadcast is sent to the other processors to do the same, STEP 602. This initializes the future external lock facility.

Subsequently, further locking requests for this module are blocked, STEP 604, and the rebuilding of locks in the future external lock facility is initiated, STEP 606. One embodiment of the logic associated with rebuilding the locks is described with reference to FIG. 6b.

Initially, a list of the locks owned by the processor and for the module whose locks are being moved is built, STEP 608, and for each lock in the list, a lock request is issued to the future external lock facility in order to reset the lock in its new location, STEP 610. In one example, the lock request issued is a Get Lock Request. One embodiment of a Get Lock Request is described in detail in U.S. Pat. No. 6,088,757, entitled "Computer Program Means And Device For Conducting High Performance Locking Facility In A Loosely Coupled Environment," Boonie et al., issued Jul. 11, 2000, which is hereby incorporated herein by reference in its entirety.

Thereafter, an inquiry is made as to whether connectivity to the current external lock facility (i.e., the lock facility assigned to this module in the current distribution table) exists, INQUIRY 612. If connectivity does exist, then the locks in the list are removed from the current external lock facility, STEP 614. In one example, this is accomplished by issuing, for each lock in the list, a Delete Lock Request (described in the aforementioned patent, U.S. Pat. No. 6,088,757) to the current external lock facility to remove the lock from that facility, STEP 614. Subsequently, or if connectivity does not exist, then processing of the rebuild locks in the future external lock facility for this module is complete.

Returning to FIG. 6a, after the processor completes the rebuild for this module, it broadcasts a message to the other processors of the complex informing them that lock rebuild is complete for this module, STEP 616. The processor waits for an acknowledgment from the other processors indicating that they have also completed rebuild for this module, STEP 617. Then, locking requests to the module are allowed, STEP 618. In one example, in order to allow the locking requests, a field within a table located within the processor's memory is set to indicate locking requests are now allowed on behalf of data on a particular module.

Additionally, changes to the module's status are now allowed, STEP 620, and processing of the move/rebuild locks for this module is complete, STEP 622. Thus, processing flows from STEP 512 (FIG. 5) to STEP 500.

Figure 2B:
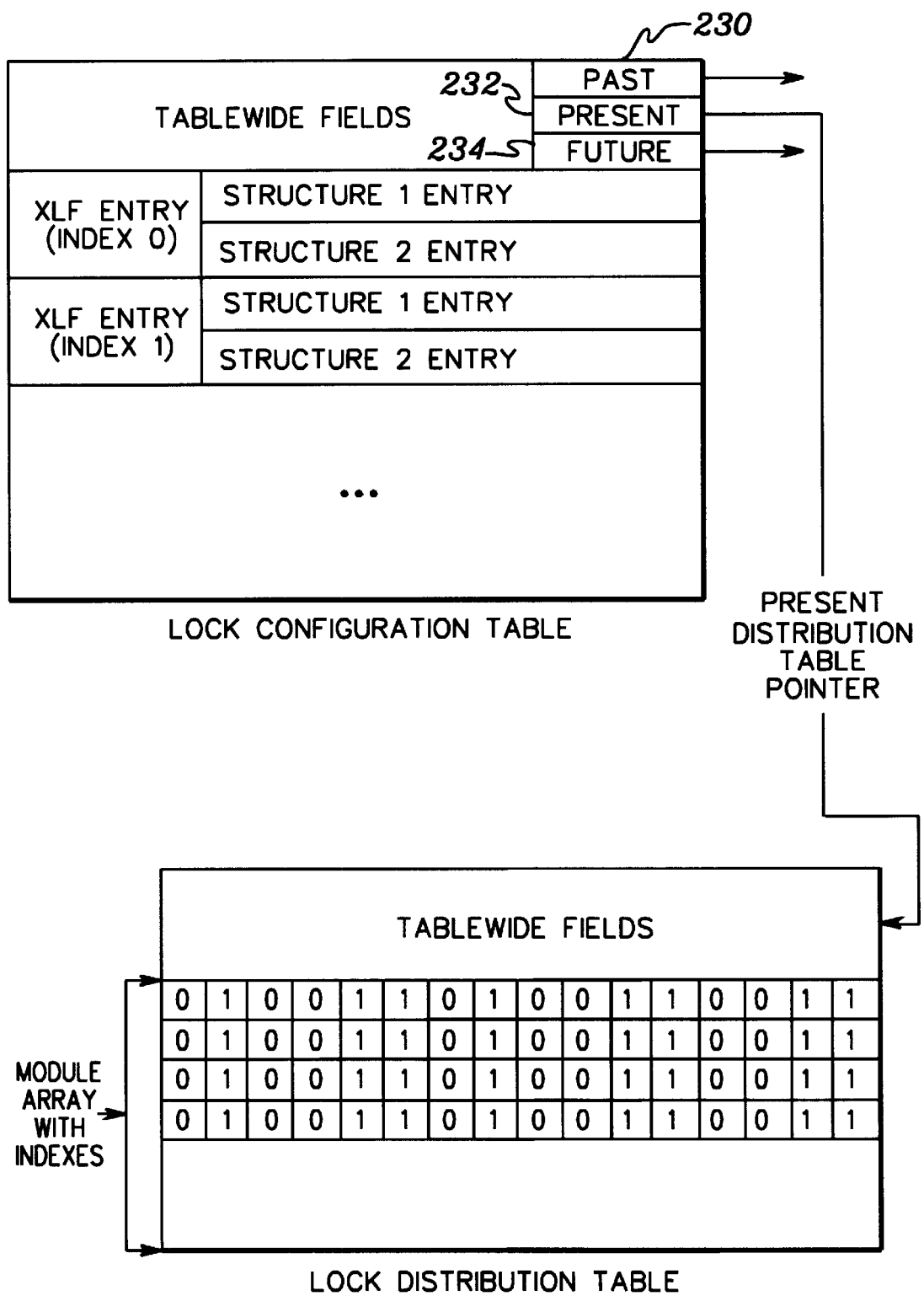
FIG. 2b depicts another example of the lock configuration table of FIG. 2a and its associated lock distribution table, after an unplanned removal of an external locking facility, in accordance with an aspect of the present invention.

Returning to FIG. 4, after rebuilding the locks for all the modules, such that the locks are now moved to their new locations, any deleted external locking facilities are removed from the locking configuration, STEP 408. That is, any external locking facilities that were not common in the new locking configuration are disconnected from and removed from the locking configuration. In particular, the external lock facility entries are removed from the lock configuration table (see FIG. 2b, in which index 2 is removed). (If this was an add of an external lock facility, then there may be no external lock facilities to be removed. However, a new slot to accommodate the new facility would have been added.)

Thereafter, since lock movement has been completed and the current configuration is no longer current, pointer 232 (FIG. 2b) is updated to indicate that the future lock distribution table is now considered the current lock distribution. Similarly, pointer 230 is set to indicate the now past distribution table, which was previously the current.

Figure 4:
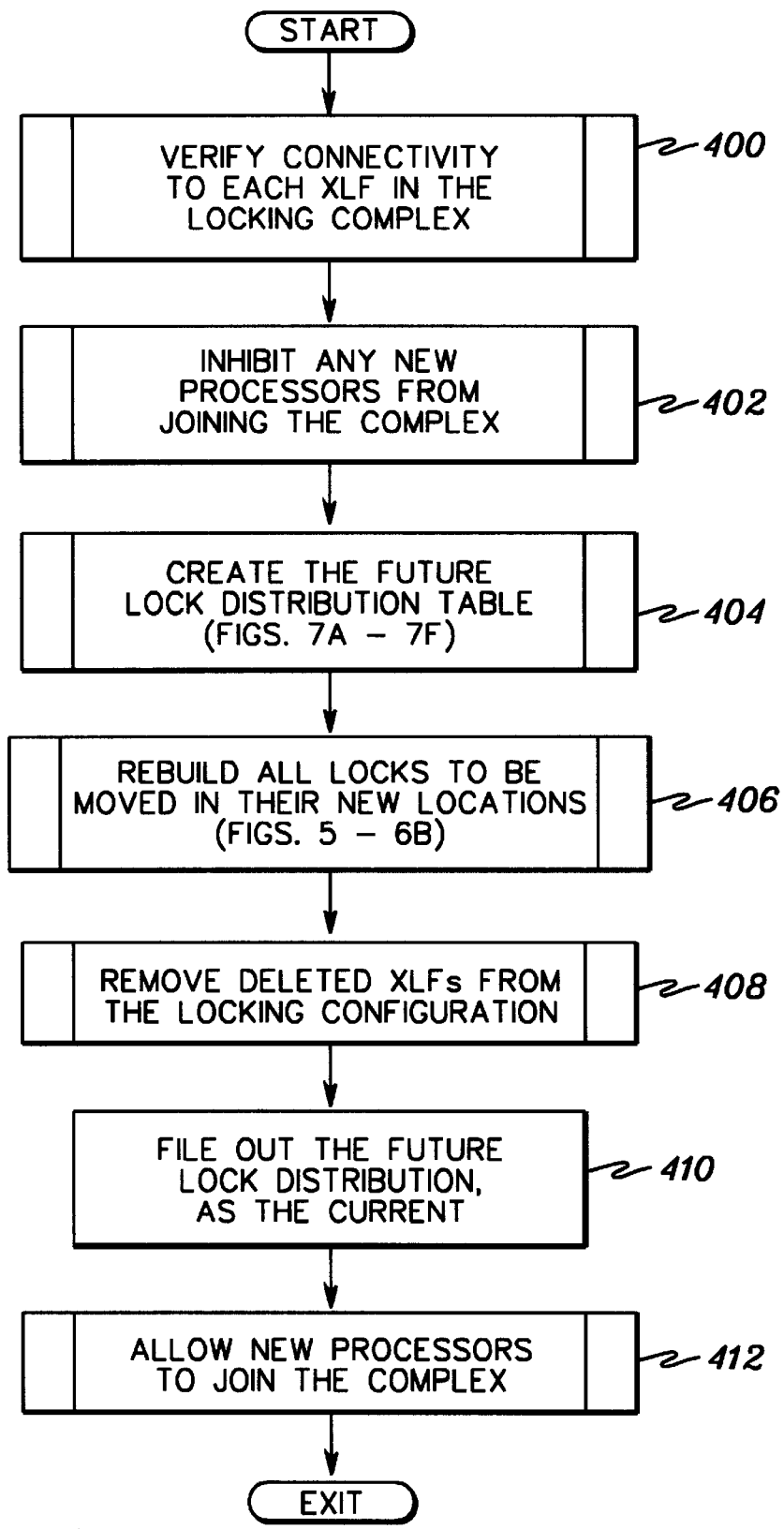
FIG. 4 depicts one embodiment of the logic associated with managing a planned or unplanned configuration change, in accordance with an aspect of the present invention.

Further, the lock distribution table is written out to a storage device in the correct location, so that it is considered the current table, STEP 410 (FIG. 4). In one example, in order to write the lock distribution table out to the storage device, a key value is used to ensure that the most current table is filed out. For instance, a timestamp passed around with the least common denominator of lock facilities is compared with a timestamp stored in the tablewide fields of the lock distribution table to be filed out. If the circulated timestamp is older than the timestamp of the table to be filed, then the file out proceeds. Otherwise, it does not.

Now, new processors are allowed to join the complex, STEP 412. Thus, the inhibitor bit is turned off to allow other processors to join the complex. Any new processor that joins the complex has the correct view of where all the locks reside for each module (i.e., it has a copy of the configuration table and the current lock distribution table).

In the logic described above with reference to FIG. 4, a future lock distribution table is created (e.g., by each of the processors). One embodiment of the logic associated with creating this table is described with reference to FIGS. 7a–7f. In order to create the future lock distribution tables, the list of common external lock facilities, as well as the current distribution table, are used, as described below.

Figure 7A:
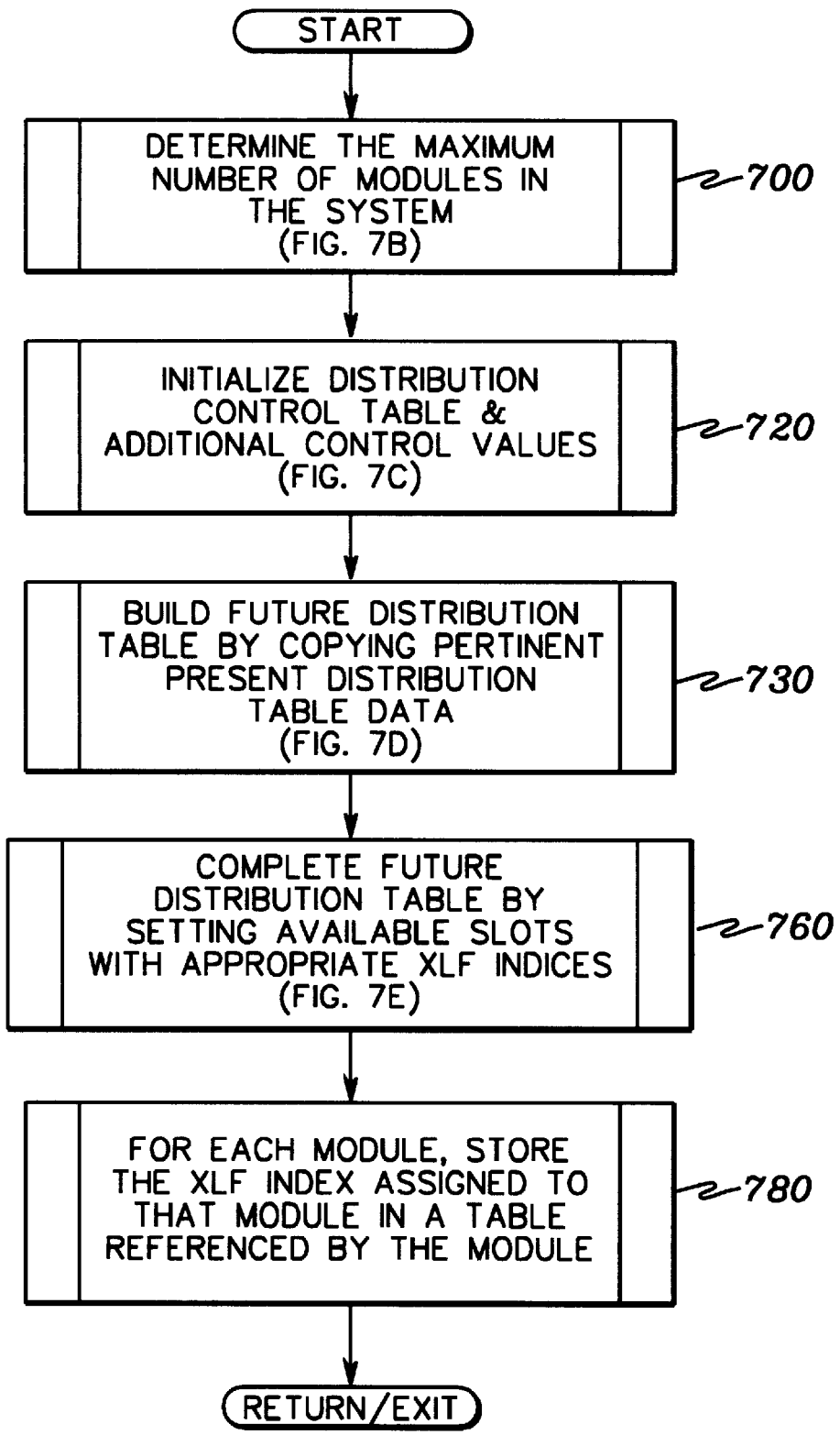
FIGS. 7a–7f depict one embodiment of the logic associated with creating a future lock distribution list, in accordance with an aspect of the present invention.
Figure 7B:
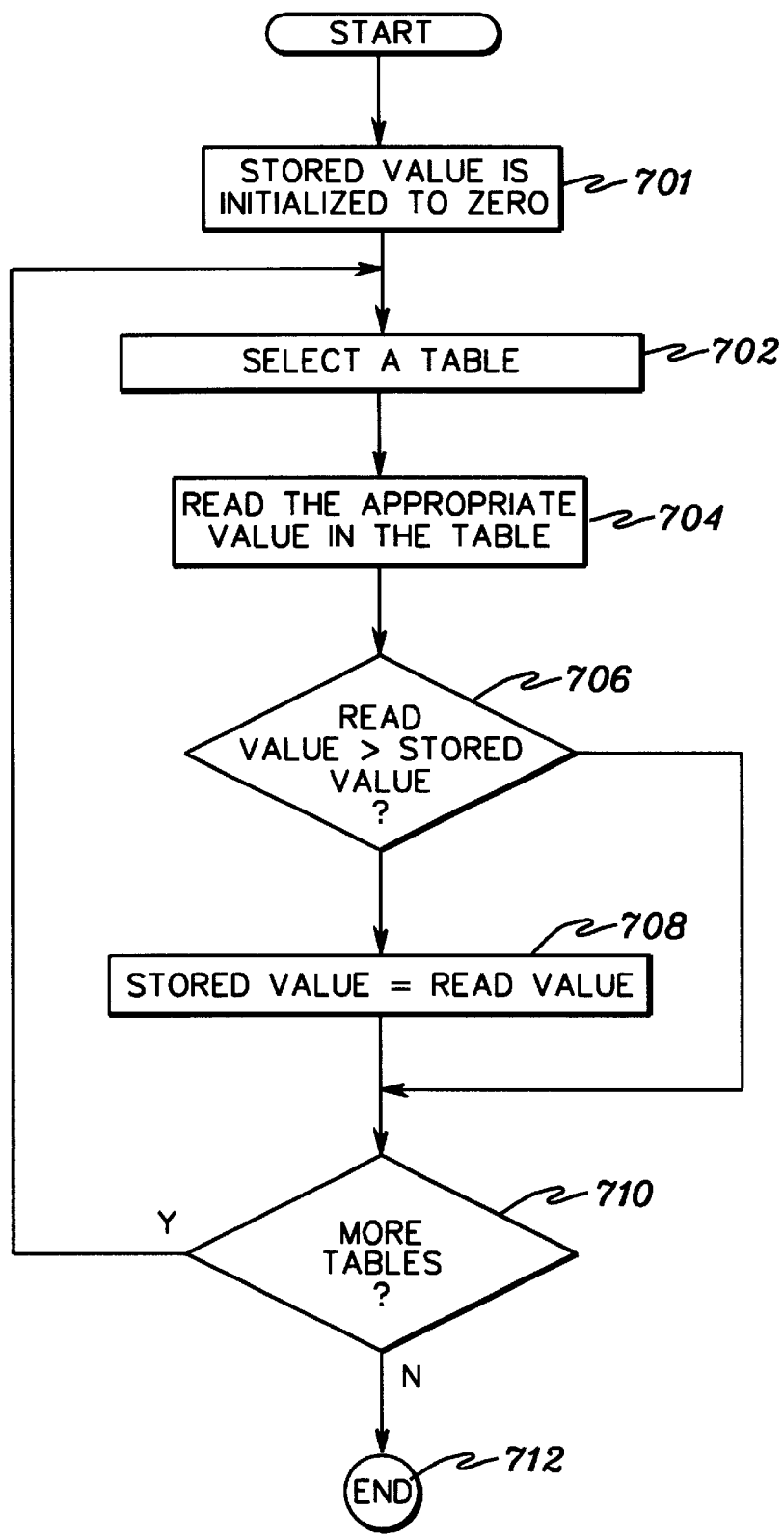
Figure 7C:
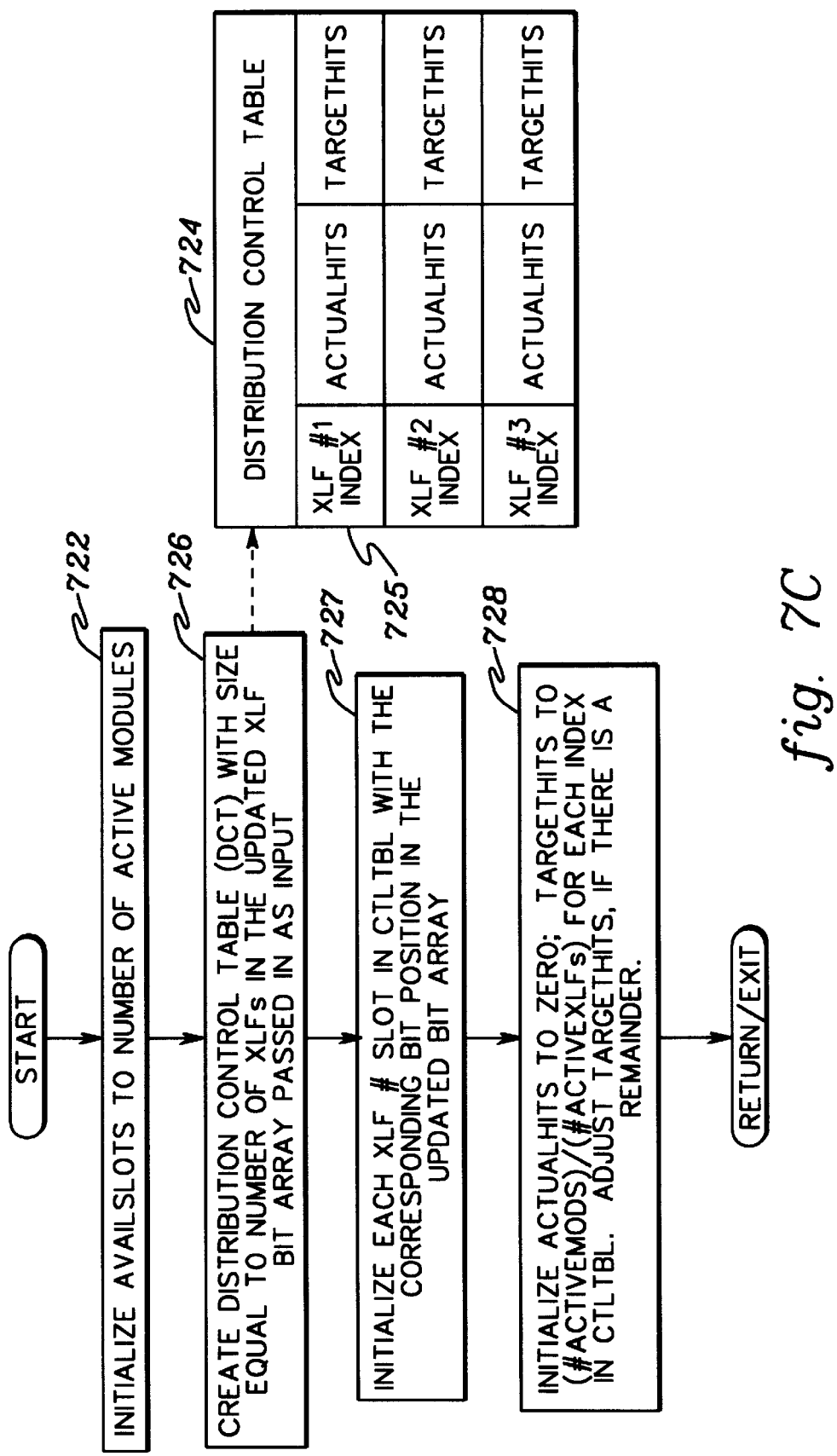

Referring to FIG. 7a., initially, a determination is made as to the maximum number of modules in the complex (i.e., e.g., the maximum number of modules utilized by TPF), STEP 700. In order to make this determination, one or more tables associated with TPF (in this example) are examined to determine the maximum number of modules. One embodiment of the logic employed in making this determination is described with reference to FIG. 7b.

Initially, a variable, referred to as stored value, is initialized to zero, STEP 701. Then, a table which has module information stored therein is selected, STEP 702, and a variable stored in the selected table, which indicates the number of modules, is read, STEP 704. Thereafter, a comparison is made to determine whether the read value is greater than the stored value, INQUIRY 706. If the read value is greater than the stored value, then the stored value is set equal to the read value, STEP 708. Next, or if the read value is less than or equal to the stored value, then processing continues with INQUIRY 710. At INQUIRY 710, a determination is made as to whether there are any more tables to be read. If there are more tables to be read, then processing continues with STEP 702. If not, then processing is complete, STEP 712.

The above logic for determining the maximum number of modules is only one example. This number can be determined in many ways. For instance, in one embodiment, the number may be provided or retrieved from one stored location. Many other embodiments are also possible.

Returning to FIG. 7a, after determining the maximum number of modules in the system, a distribution control table, which includes an entry for each external lock facility in the common list of facilities, and additional control values are initialized, STEP 720. One embodiment of the logic associated with creating this table and initializing the various control values is further described with reference to FIG. 7c.

Initially, a variable, referred to as available slots (a.k.a., availSlots), is set equal to the number of active modules in the complex, which was determined in the above step, STEP 722. Additionally, a distribution control table 724 is created in which its size is equal to the number of external locking facilities in the updated list of common facilities (a.k.a., the active bit array) passed in as input, STEP 726. In the distribution control table, there is an entry 725 for each external locking facility common to the processors, and each entry includes, for instance, a value representative of the actual hits for that external locking facility, as well as a value indicative of the target hits, as described below.

Subsequently, the index of each entry of the distribution control table is initialized with the index value of the corresponding entry in the lock configuration table, STEP 727. Further, for each entry in the control table, actualHits is initialized to zero, and targetHits is initialized to the (number of active modules)/(the number of active external locking facilities), STEP 728. If there is a remainder with the division, then targetHits is adjusted upwards.

Returning to FIG. 7a, after creating and initializing the distribution control table, a first phase of the building of the future distribution table is commenced. This first phase includes the copying of pertinent present distribution table data into the appropriate locations of the future distribution table, STEP 730. In one example, the logic used for this initial build copies valid external locking facility indices from the present distribution table into the future distribution table for the modules whose lock residency did not change. A slot in the table is valid if the external locking facility located in the present table is still active for locking and the total number of slots (i.e., online modules) using this external locking facility for locking has not been reached (i.e., targetHits has not been reached).

One example of the logic associated with initially filling the future distribution table is described in further detail with reference to FIG. 7d. The input for this logic is the distribution control table and the number of modules (i.e., available slots), and the output is a partially filled future distribution table.

Figure 7D:
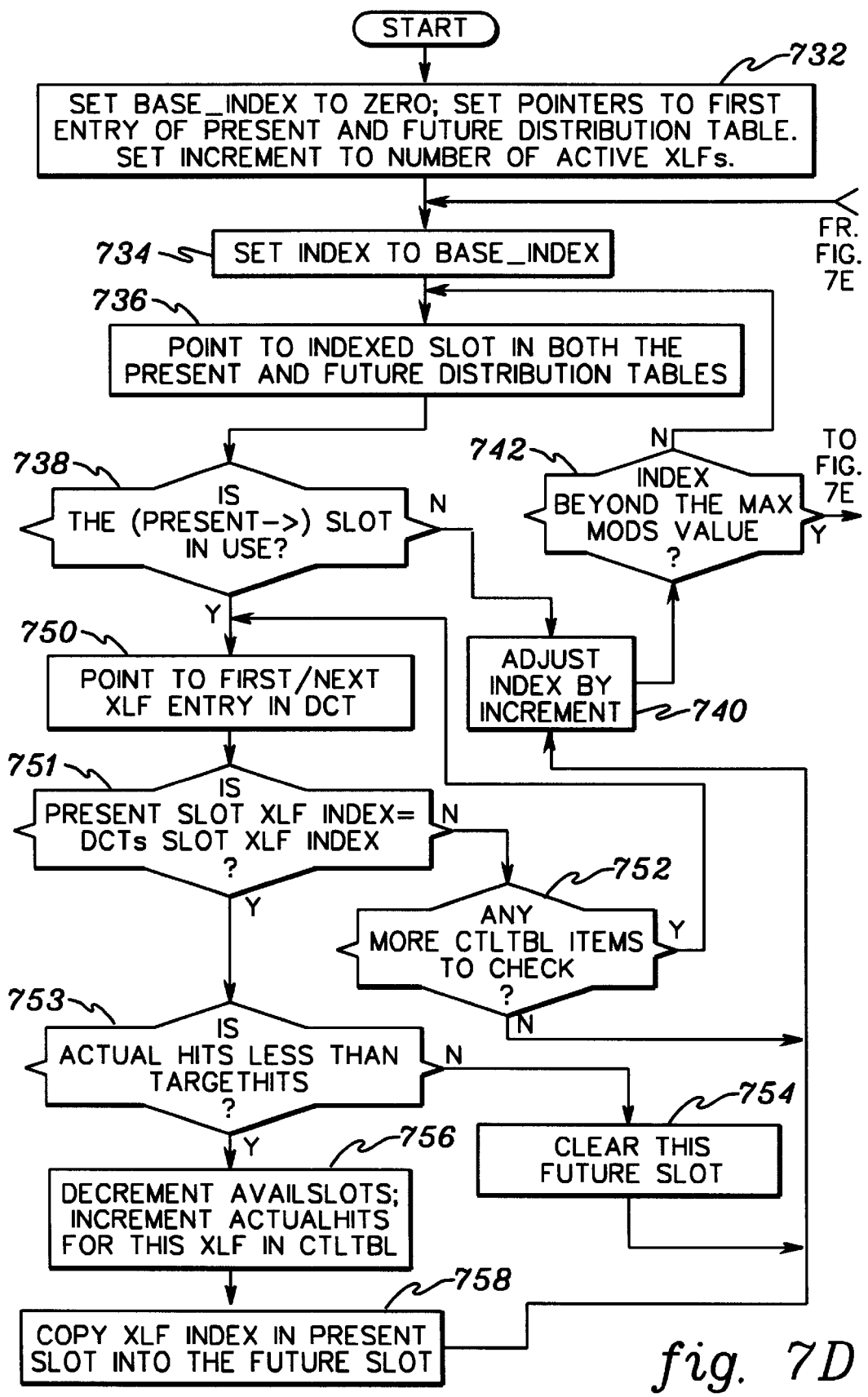
Figure 7E:
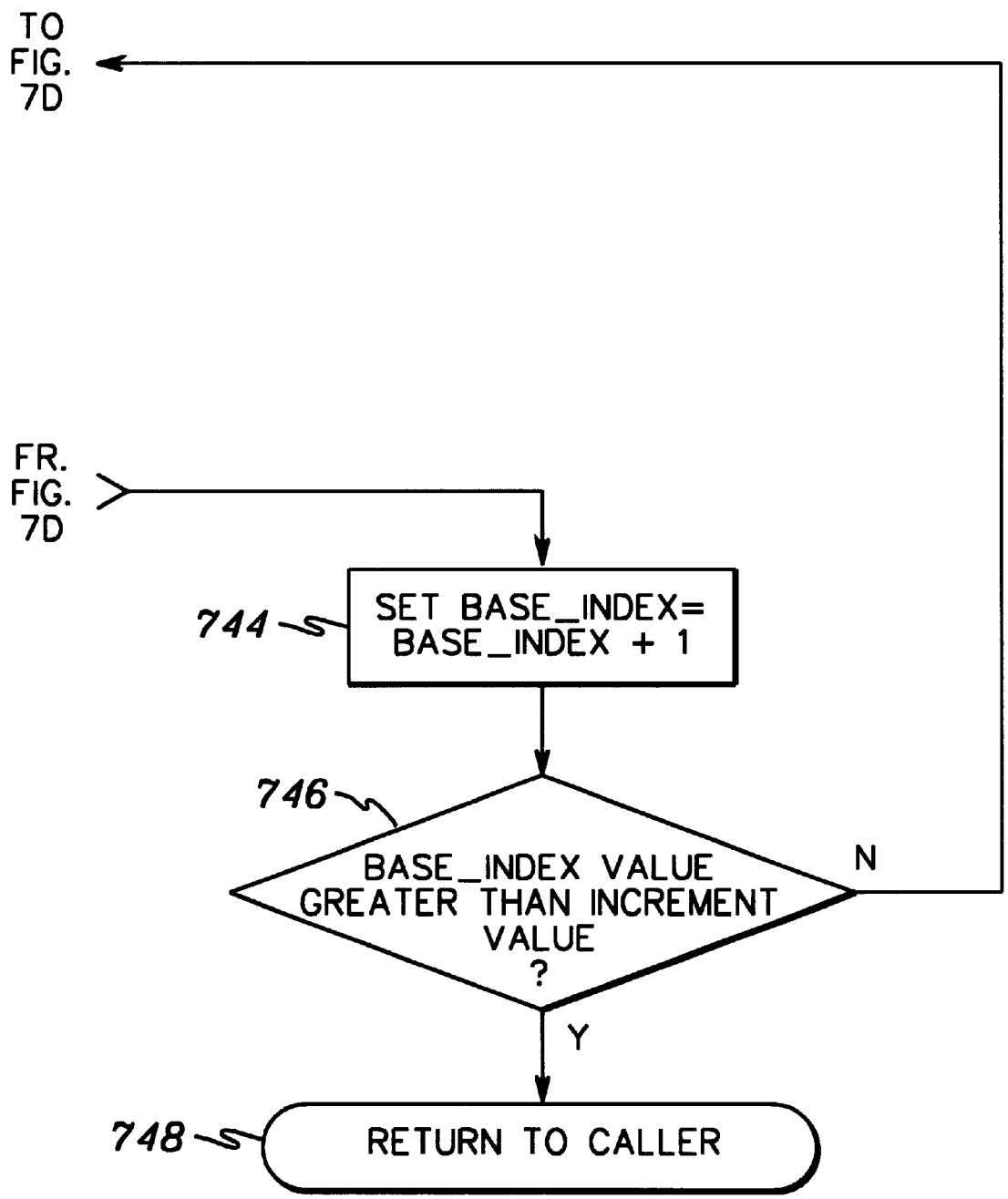
Figure 7F:
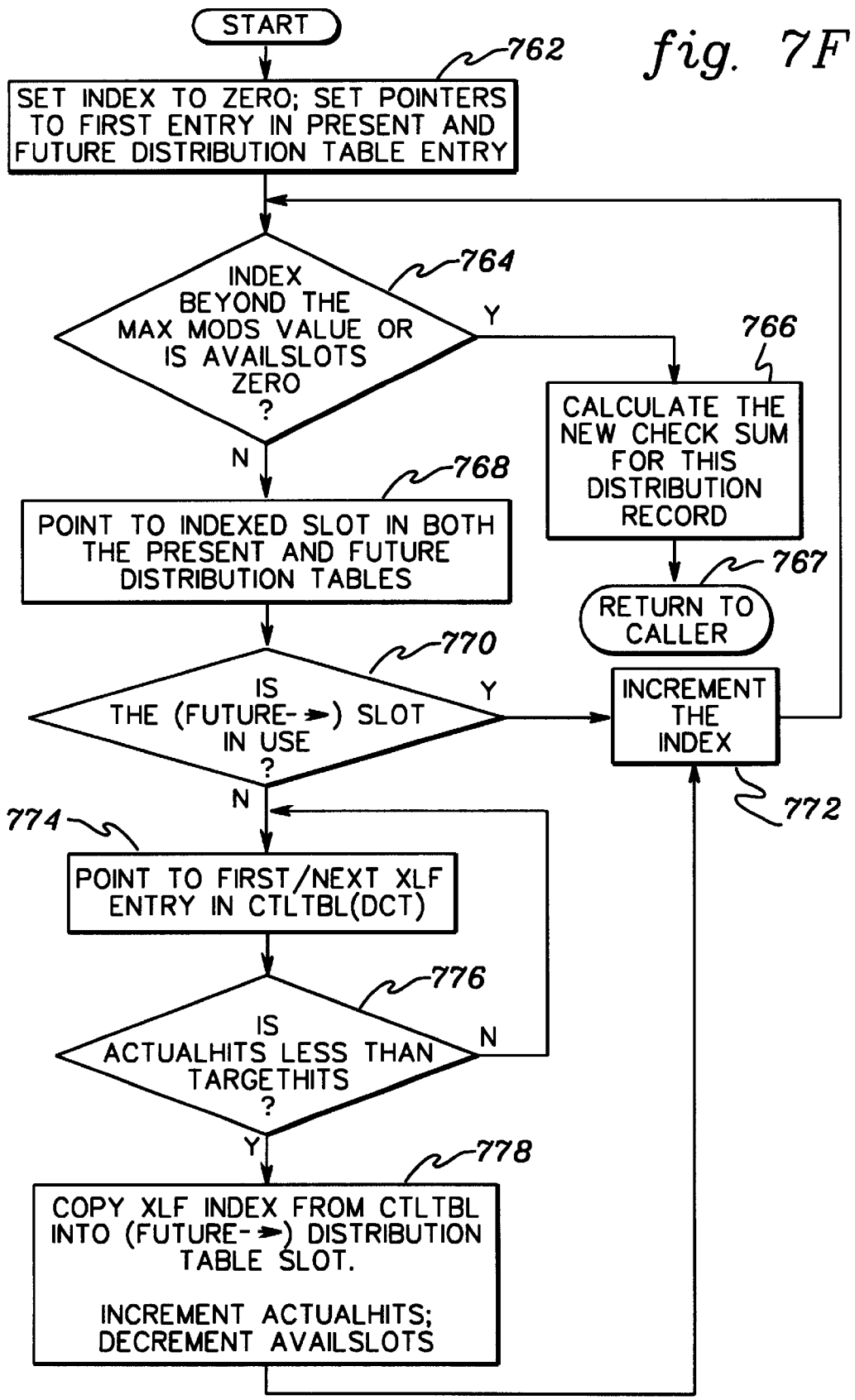

Referring to FIG. 7d, initially, a variable, referred to as base_index, is set to zero; a present pointer is set to the first entry of the present distribution table; a future pointer is set to the first entry of the future distribution table; and a variable, referred to as increment, is set equal to the number of active external lock facilities (i.e., availSlots), STEP 732. Additionally, a variable, referred to as index, is set equal to the base_index, STEP 734.

Subsequently, the present and future pointers are employed to point to the indexed slot in both the present and future distribution tables, STEP 736. Then, a determination is made as to whether the slot in the present table is in use (i.e., not null), INQUIRY 738. If the slot is not in use, then the index is adjusted by the increment, STEP 740, and a determination is made as to whether the index is beyond the maximum modules (max mods) value, INQUIRY 742. If the index is not beyond the max mods value, then processing continues with STEP 736. However, if the index is beyond the max mods value, then the base_index is set equal to the base index plus 1, STEP 744 (FIG. 7e), and a further determination is made as to whether the base_index value is greater than the increment value, INQUIRY 746. Should the base_index value be greater than the increment value, then processing of the copy present logic is complete, STEP 748. On the other hand, if the base_index value is less than or equal to the increment value, then processing continues with STEP 734 (FIG. 7d).

Returning to INQUIRY 738, if the slot pointed to in the present table is in use, then reference is made to the first/next external lock facility entry in the distribution control table (DCT), STEP 750. Next, a determination is made as to whether the index of the present slot is equal to the index of DCT's slot, INQUIRY 751. If not, then a further determination is made as to whether there are any more control table items to check, INQUIRY 752. Should there be no more control table items to check, then processing continues with STEP 740. However, if there are more control table items to check, then processing continues with STEP 750.

Returning to INQUIRY 751, if the present slot external lock facility index is equal to the distribution control table's slot external lock facility index, then a further determination is made as to whether actualHits is less than the targetHits, INQUIRY 753. If actualHits is not less than targetHits, then the appropriate slot in the future distribution table is cleared by setting it to a null value, STEP 754. Thereafter, processing continues with STEP 740.

However, if actualHits is less than targetHits, then availSlots is decremented and actualHits is incremented for this external lock facility in the control table, STEP 756. Additionally, the external lock facility index in the present distribution table at the referenced slot is copied into the corresponding slot in the future distribution table, STEP 758. Processing then continues with STEP 740.

Returning to FIG. 7a, subsequent to completing the initial phase of building the future distribution table, in which pertinent present distribution table data is copied, the future distribution table is completed by setting available slots with the appropriate external locking facility indices, STEP 760. In this phase, the remaining modules that have not been assigned are assigned to an external locking facility. A round robin search is made through the distribution control table searching for an external lock facility that has not exceeded its target number of hits. When a facility is found and the assignment is made, the number of target hits is incremented, and if actualHits is equal to targetHits, then no more modules are assigned to that external lock facility. One example of the logic associated with completing the future distribution table is described with reference to FIG. 7f.

Initially, index is once again set equal to zero, the present pointer is set to the first entry in the present distribution table, and the future pointer is set to the first entry in the future distribution table, STEP 762. Thereafter, a determination is made as to whether index is beyond the max mods value or whether availSlots is equal to zero, INQUIRY 764. If the index is beyond the max mods value or the available slots is equal to zero, then a data integrity check is performed, STEP 766. In one example, a new check sum for the distribution table record of the future distribution table is calculated and used to ensure the integrity of the data. This completes processing of this phase, STEP 767.

However, if the index is not beyond the max mods value or the available slots is not equal to zero, then the present and future pointers are used to reference the indexed slot in both the present and future distribution tables, respectively, STEP 768.

Subsequently, a determination is made as to whether the future slot is in use (i.e., not null), INQUIRY 770. If the future slot is in use, then the index is incremented, STEP 772, and processing continues with INQUIRY 764. However, if the future slot is not in use, then the first/next entry in the distribution control table is selected, STEP 774.

Next, a determination is made as to whether actualHits of the selected entry is less than targetHits of that entry, INQUIRY 776. If the actual hits is not less than the target hits, then processing continues with STEP 774. However, if actual hits is less than target hits, then the external lock facility index is copied from the control table into the referenced slot of the future distribution table, STEP 778. Additionally, actual hits is incremented, available slots is decremented, and processing continues with STEP 772. This completes the creation of the future distribution table.

Returning to FIG. 7a, after completing the future distribution table, a table referenced by the modules during I/O operations is updated, STEP 780. In particular, for each module, the index of the locking facility assigned to that module is stored in the table. This table is cached, so that the performance of I/O operations is not degraded.

As described in detail above, locks associated with a configuration change are managed. In the wake of a configuration change (due to either the unplanned or planned adding or deleting of a locking facility), locks are moved from one or more facilities to one or more other facilities in such a manner that a minimal amount of moving is performed. As described above, each of the processors independently performs its own redistribution of the locks it owns. Each processor starts from a known point and each independently determines a common configuration (i.e., the least common denominator), which is then used by the processor to independently restructure (with synchronization points) its locks. The locks are not tied to the data, and therefore, the locks may move around without affecting the data.

The embodiments described above are only examples. Various additions, deletions and/or modifications can be made without departing from the spirit of the present invention. For example, in the embodiments described above, the lock facilities are external from the processors. This is only one example. In another embodiment, the lock facilities may be internal to the processors (e.g., within a logical partition that is separate from the operating system partitions of the processor), or the lock facilities may be a combination of internal and external facilities.

In yet a further example, the lock facilities need not be coupling facilities. Any other entity that is remote from the storage mechanism and the operating systems, and can support locks and lock management functions, such as, for instance, keeping track of processors waiting for locks and informing processors when locks are available; and keeping track of the name of the locked resources, can be used as locking facilities.

Additionally, in the embodiments above, the storage devices are DASD. Again, this is only one example. Aspects of the present invention are equally applicable to other types of storage devices. Further, in the examples herein, a module includes a pair of DASD devices (e.g., a primary and secondary). Again, this is only one example, and it is not necessary for the module to include a pair of DASD devices.

Described in detail above is a dynamic reconfiguration technique in which locks are moved on the fly. This technique is usable by continuously or nearly continuously available systems, and minimizes downtime. TPF can continue to operate and lock I/Os can be submitted for currently executing lock facilities.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing changes in locking configurations, said method comprising:

detecting a configuration change of a locking configuration, said locking configuration comprising one or more locking facilities, and said one or more locking facilities comprising one or more locks; and redistributing at least one lock, in response to detecting the configuration change of the locking configuration, wherein the redistributing is independent of where data associated with the at least one lock is stored, in that the redistributing does not change where the data is stored.

2. The method of claim 1, wherein said redistributing is of a plurality of locks owned by at least two processors, and wherein each processor of said at least two processors manages the redistributing of one or more locks owned by that processor.

3. The method of claim 1, wherein said redistributing comprises moving said at least one lock from at least one locking facility of said locking configuration to one or more locking facilities of another locking configuration reflecting the change.

4. The method of claim 1, wherein the redistributing minimizes a number of lock moves.

5. The method of claim 1, wherein said one or more locking facilities are independent of a mechanism used to store the data and independent of processors with operating system images.

6. The method of claim 1, wherein said one or more locking facilities comprise at least one of one or more external locking facilities, which are separate from processors having operating systems, and one or more internal locking facilities, which are within one or more processors, but in one or more partitions separate from one or more partitions having operating system images.

7. The method of claim 1, wherein said detecting comprises detecting at least one of an unplanned change and a planned change in the locking configuration.

8. The method of claim 1, wherein said detecting comprises detecting that at least one locking facility of said one or more locking facilities is not available to at least one processor.

9. The method of claim 1, wherein said detecting comprises detecting at least one of the following: that at least one locking facility is to be added to the locking configuration, and that at least one locking facility is to be deleted from the locking configuration.

10. The method of claim 1, wherein said redistributing comprises:
determining a locking configuration common to a plurality of processors to obtain a common locking configuration, said common locking configuration comprising one or more common locking facilities;
creating a distribution list using the common locking configuration, said distribution list indicating an assignment of the one or more locks to the one or more common locking facilities; and
moving the at least one lock to be redistributed based on the distribution list.

11. The method of claim 2, further comprising determining a locking configuration common to said at least two processors to obtain a common locking configuration, and using the common locking configuration in the redistributing.

12. The method of claim 3, wherein at least one locking facility of the one or more locking facilities of the another locking configuration comprises at least one locking facility of said locking configuration.

13. The method of claim 1, wherein said detecting comprises at least one of the following:
determining that a change in the locking configuration has occurred; and
receiving notification that a change has occurred.

14. The method of claim 10, wherein said determining comprises:
creating, by each processor of the plurality of processors, a list of locking facilities with which the processor can communicate; and
using the lists to determine the common locking configuration.

15. The method of claim 10, wherein said creating comprises assigning to each storage device module of a plurality of storage device modules one of the one or more common locking facilities, wherein at least a portion of the plurality of storage device modules has an association with one or more locks of the one or more common locking facilities.

16. The method of claim 14, wherein the using is performed by each processor, and wherein the using comprises for each processor:
obtaining the lists of locking facilities created by the plurality of processors to obtain a collection of lists; and
selecting from the collection of lists the one or more locking facilities located on the collection of lists.

17. The method of claim 15, wherein said assigning comprises:
assigning to each storage device module of one or more of the plurality of storage device modules the same locking facility that was assigned to that storage device module in the locking configuration that changed; and
assigning to each storage device module of one or more remaining storage device modules a different locking facility than assigned to that storage device module in the locking configuration that changed.

18. The method of claim 15, wherein the assigning of the one or more common locking facilities is based on a round-robin selection of the common locking facilities.

19. A system of managing changes in locking configurations, said system comprising:
means for detecting a configuration change of a locking configuration, said locking configuration comprising one or more locking facilities, and said one or more locking facilities comprising one or more locks; and
means for redistributing at least one lock, in response to detecting the configuration change of the locking configuration, wherein the redistributing is independent of where data associated with the at least one lock is stored, in that the redistributing does not change where the data is stored.

20. The system of claim 19, wherein said means for redistributing comprises means for redistributing a plurality of locks owned by at least two processors, and wherein each processor of said at least two processors manages the redistributing of one or more locks owned by that processor.

21. The system of claim 19, wherein said means for redistributing comprises means for moving said at least one lock from at least one locking facility of said locking configuration to one or more locking facilities of another locking configuration reflecting the change.

22. The system of claim 19, wherein the means for redistributing minimizes a number of lock moves.

23. The system of claim 19, wherein said one or more locking facilities are independent of a mechanism used to store the data and independent of processors with operating system images.

24. The system of claim 19, wherein said one or more locking facilities comprise at least one of one or more external locking facilities, which are separate from processors having operating systems, and one or more internal locking facilities, which are within one or more processors, but in one or more partitions separate from one or more partitions having operating system images.

25. The system of claim 19, wherein said means for detecting comprises means for detecting at least one of an unplanned change and a planned change in the locking configuration.

26. The system of claim 19, wherein said means for detecting comprises means for detecting that at least one locking facility of said one or more locking facilities is not available to at least one processor.

27. The system of claim 19, wherein said means for detecting comprises means for detecting at least one of the following: that at least one locking facility is to be added to the locking configuration, and that at least one locking facility is to be deleted from the locking configuration.

28. The system of claim 19, wherein said means for detecting comprises at least one of the following:
   means for determining that a change in the locking configuration has occurred; and
   means for receiving notification that a change has occurred.

29. The system of claim 19, wherein said means for redistributing comprises:
   means for determining a locking configuration common to a plurality of processors to obtain a common locking configuration, said common locking configuration comprising one or more common locking facilities;
   means for creating a distribution list using the common locking configuration, said distribution list indicating an assignment of the one or more locks to the one or more common locking facilities; and
   means for moving the at least one lock to be redistributed based on the distribution list.

30. The system of claim 20, further comprising means for determining a locking configuration common to said at least two processors to obtain a common locking configuration, and wherein said means for redistributing comprises means for using the common locking configuration in the redistributing.

31. The system of claim 21, wherein at least one locking facility of the one or more locking facilities of the another locking configuration comprises at least one locking facility of said locking configuration.

32. The system of claim 29, wherein said means for determining comprises:
   means for creating, by each processor of the plurality of processors, a list of locking facilities with which the processor can communicate; and
   means for using the lists to determine the common locking configuration.

33. The system of claim 29, wherein said means for creating comprises means for assigning to each storage device module of a plurality of storage device modules one of the one or more common locking facilities, wherein at least a portion of the plurality of storage device modules has an association with one or more locks of the one or more common locking facilities.

34. The system of claim 32, wherein the means for using is performed by each processor, and wherein the means for using comprises for each processor:
   means for obtaining the lists of locking facilities created by the plurality of processors to obtain a collection of lists; and
   means for selecting from the collection of lists the one or more locking facilities located on the collection of lists.

35. The system of claim 33, wherein said means for assigning comprises:
   means for assigning to each storage device module of one or more of the plurality of storage device modules the same locking facility that was assigned to that storage device module in the locking configuration that changed; and
   means for assigning to each storage device module of one or more remaining storage device modules a different locking facility than assigned to that storage device module in the locking configuration that changed.

36. The system of claim 33, wherein the means for assigning of the one or more common locking facilities is based on a round-robin selection of the common locking facilities.

37. A system of managing changes in locking configurations, said system comprising:
   at least one processor adapted to detect a configuration change of a locking configuration, said locking configuration comprising one or more locking facilities, and said one or more locking facilities comprising one or more locks; and
   at least one processor adapted to redistribute at least one lock, in response to detecting the configuration change of the locking configuration, wherein the redistributing is independent of where data associated with the at least one lock is stored, in that the redistributing does not change where the data is stored.

38. At least one program storage device readable by a machine, tangibly embodying at least one program of instructions executable by the machine to perform a method of managing changes in locking configurations, said method comprising:
   detecting a configuration change of a locking configuration, said locking configuration comprising one or more locking facilities, and said one or more locking facilities comprising one or more locks; and
   redistributing at least one lock, in response to detecting the configuration change of the locking configuration, wherein the redistributing is independent of where data associated with the at least one lock is stored, in that the redistributing does not change where the data is stored.

39. The at least one program storage device of claim 38, wherein said redistributing is of a plurality of locks owned by at least two processors, and wherein each processor of said at least two processors manages the redistributing of one or more locks owned by that processor.

40. The at least one program storage device of claim 38, wherein said redistributing comprises moving said at least one lock from at least one locking facility of said locking configuration to one or more locking facilities of another locking configuration reflecting the change.

41. The at least one program storage device of claim 38, wherein the redistributing minimizes a number of lock moves.

42. The at least one program storage device of claim 38, wherein said one or more locking facilities are independent of a mechanism used to store the data and independent of processors with operating system images.

43. The at least one program storage device of claim 38, wherein said one or more locking facilities comprise at least one of one or more external locking facilities, which are separate from processors having operating systems, and one or more internal locking facilities, which are within one or more processors, but in one or more partitions separate from one or more partitions having operating system images.

44. The at least one program storage device of claim 38, wherein said detecting comprises detecting at least one of an unplanned change and a planned change in the locking configuration.

45. The at least one program storage device of claim 38, wherein said detecting comprises detecting that at least one locking facility of said one or more locking facilities is not available to at least one processor.

46. The at least one program storage device of claim 38, wherein said detecting comprises detecting at least one of the following: that at least one locking facility is to be added to the locking configuration, and that at least one locking facility is to be deleted from the locking configuration.

47. The at least one program storage device of claim 38, wherein said detecting comprises at least one of the following:

determining that a change in the locking configuration has occurred; and receiving notification that a change has occurred.

48. The at least one program storage device of claim 38, wherein said redistributing comprises:

determining a locking configuration common to a plurality of processors to obtain a common locking configuration, said common locking configuration comprising one or more common locking facilities;

creating a distribution list using the common locking configuration, said distribution list indicating an assignment of the one or more locks to the one or more common locking facilities; and moving the at least one lock to be redistributed based on the distribution list.

49. The at least one program storage device of claim 39, wherein said method further comprises determining a locking configuration common to said at least two processors to obtain a common locking configuration, and using the common locking configuration in the redistributing.

50. The at least one program storage device of claim 40, wherein at least one locking facility of the one or more locking facilities of the another locking configuration comprises at least one locking facility of said locking configuration.

51. The at least one program storage device of claim 50, wherein said determining comprises:

creating, by each processor of the plurality of processors, a list of locking facilities with which the processor can communicate; and using the lists to determine the common locking configuration.

52. The at least one program storage device of claim 48, wherein said creating comprises assigning to each storage device module of a plurality of storage device modules one of the one or more common locking facilities, wherein at least a portion of the plurality of storage device modules has an association with one or more locks of the one or more common locking facilities.

53. The at least one program storage device of claim 51, wherein the using is performed by each processor, and wherein the using comprises for each processor:

obtaining the lists of locking facilities created by the plurality of processors to obtain a collection of lists; and selecting from the collection of lists the one or more locking facilities located on the collection of lists.

54. The at least one program storage device of claim 52, wherein said assigning comprises:

assigning to each storage device module of one or more of the plurality of storage device modules the same locking facility that was assigned to that storage device module in the locking configuration that changed; and assigning to each storage device module of one or more remaining storage device modules a different locking facility than assigned to that storage device module in the locking configuration that changed.

55. The at least one program storage device of claim 52, wherein the assigning of the one or more common locking facilities is based on a round-robin selection of the common locking facilities.

* * * * *